United States Patent
Wilson et al.

(10) Patent No.: US 7,536,718 B2
(45) Date of Patent: May 19, 2009

(54) METHOD AND SYSTEM FOR CONTROLLING SOFTWARE LOADS ON A THIRD-PARTY MOBILE STATION

(75) Inventors: Nicholas Bryson Wilson, Ottawa (CA); John Stuart Hodgson, Ottawa (CA); Paul Edward Landry, Burlington (CA)

(73) Assignee: Research in Motion Limited, Waterloo, ON (CA)

( * ) Notice: Subject to any disclaimer, the term of this patent is extended or adjusted under 35 U.S.C. 154(b) by 0 days.

(21) Appl. No.: 12/142,155

(22) Filed: Jun. 19, 2008

(65) Prior Publication Data
US 2008/0271136 A1    Oct. 30, 2008

Related U.S. Application Data

(63) Continuation of application No. 11/017,902, filed on Dec. 22, 2004, now Pat. No. 7,412,232.

(51) Int. Cl.
*H04L 9/32* (2006.01)
*G06F 15/16* (2006.01)

(52) U.S. Cl. .................................... 726/13; 726/3

(58) Field of Classification Search ............... 726/14, 726/3; 707/103, 203; 717/11, 3, 178; 455/418, 455/419, 420
See application file for complete search history.

(56) References Cited

U.S. PATENT DOCUMENTS

| | | | |
|---|---|---|---|
| 6,289,510 B1 | 9/2001 | Nakajima | |
| 6,332,217 B1 | 12/2001 | Hastings | |
| 6,496,979 B1 | 12/2002 | Chen et al. | |
| 6,687,901 B1 | 2/2004 | Imamatsu | |
| 7,149,641 B2* | 12/2006 | Gopal et al. | 702/108 |
| 7,200,362 B2 | 4/2007 | Muratsu | |
| 7,222,341 B2* | 5/2007 | Forbes et al. | 717/170 |
| 7,228,537 B2* | 6/2007 | Murray | 717/168 |
| 2003/0041125 A1 | 2/2003 | Salomon | |
| 2004/0107417 A1 | 6/2004 | Chia et al. | |
| 2005/0188371 A1 | 8/2005 | Bocking et al. | |

FOREIGN PATENT DOCUMENTS

EP    1329789    7/2003

OTHER PUBLICATIONS

Research in Motion Limited, "Deploying BlackBerry Desktop and Handheld Software", Manual, 2003. No month listed.
European Search Report, EP 04106849 dated Apr. 6, 2005.
European Examination Report, EP 04106849 dated Oct. 10, 2007.

* cited by examiner

*Primary Examiner*—Melody Mehrpour
(74) *Attorney, Agent, or Firm*—Moffat & Co.

(57) ABSTRACT

A system and method for allowing a licensee having mobile station hardware to support its own set of carriers and software demands of these carriers, the software including licensor software, the method comprising the steps of: assigning a unique third party identifier to the licensee; assigning a range of carrier identifiers for the licensee; allowing the licensee to create a unique identifier by combining the unique third party identifier with an identifier chosen from the range of carrier identifiers; and associating, in a gateway program, the unique identifier with one or more software versions acceptable by a carrier for download onto the mobile station hardware.

9 Claims, 4 Drawing Sheets

METHOD AND SYSTEM FOR CONTROLLING SOFTWARE LOADS ON A THIRD-PARTY MOBILE STATION

RELATED APPLICATIONS

The present application is a continuation of U.S. application Ser. No. 11/017,902, filed Dec. 22, 2004, the contents of which are incorporated by reference herein.

FIELD OF THE APPLICATION

The present application presents a method and system for controlling software loads on a third-party mobile station manufactured by a third-party software licensee, and specifically, to a method and system giving a third-party software licensee control over software version loads allowed to be downloaded to the licensee's mobile station.

BACKGROUND

In mobile communications systems, each carrier implements their system slightly differently. For data enabled mobile stations, the carriers want control over software loads on the data devices to ensure these loads run well on their systems. Each software load needs to be pre-approved prior to the load being released for use on the carrier's network.

Until recently, innovator mobile data station manufacturers developed software providing novel functionality only available on innovators' mobile data stations. Mobile data station manufacturers had to engage carriers directly in deploying services enabled by the innovative functionality they created.

Control over software loads is implemented within current mobile stations through a combination of a unique vendor identifier stored within the read-only memory of the mobile station and a proprietary desktop file that allows or denies the ability to download software onto that mobile station. Specifically, if a carrier approves a software load, this approval is reflected in the proprietary file that would then allow a mobile station associated with the carrier's unique identifier to load that software onto the mobile station.

Market acceptance of innovative software and market forces resulting from the competitive environment in the mobile services arena have lead to a desire for the innovative mobile data station functionality, previously only available on innovator mobile data stations, be to provisioned onto third-party manufacturers' mobile data stations, perhaps along with existing functionality. In such a competitive environment, the innovator becomes a licensor of novel functionality software while the third-party manufacturers of mobile data stations become licensees of the novel functionality software.

The problem with the above described software load control mechanism arises in the situation where data device licensed software is loaded onto a third-party mobile station. In this case, the licensor of the data device software loses control over the relationship between the third-party licensee and the carrier. Since negotiations about software loads that are acceptable for loading onto the third-party device will be between the licensee and the carrier, it is undesirable for the licensor of the data device software to maintain a gatekeeper file specifying which software versions are allowed for upload onto a particular mobile station. Further, licensees will sometimes want to load their own applications and application versions, or the applications of other manufacturers besides those of the licensor, for which third party manufacturers want to have control over. It would be onerous for the licensor to maintain a gatekeeper program having all of this information added.

In a competitive environment, each mobile data station manufacturer, innovator or not, engages a corresponding group of carriers wherein some carrier overlap is inevitable.

SUMMARY

It is desirable for a third party licensee to coordinate control of both the licensor software versions and any other software from third parties that are being loaded onto the mobile station.

The present system and method addresses the above by extending the existing vendor identification process to include the concept of a license. Means are provided for enforcing a licensing agreement via a contractual agreement identifier specifying a combination of a third-party licensee identifier and a carrier identifier. In a preferred embodiment, an existing 32-bit vendor identifier is modified to assign the first 8 bits to the unique third-party licensee, leaving each third-party licensee with the ability to assign the remaining 24 bits for each carrier relationship that the third-party licensee has. This, therefore, allows the third-party licensee to have up to 24 bits, or 16,777,215 carrier relationships. Further, since each third-party licensee has a unique identifier associated with them, control over the desktop gatekeeper file that regulates software loads permitted on the mobile station of the third party licensee can be transferred to the third-party licensee. This eliminates the need for the software licensor to maintain the file.

The present application therefore provides a method for allowing a licensee having mobile station hardware to support its own set of carriers and addresses the software demands of these carriers, the software including at least one licensor software and mobile station manufacturer software, the method comprising the steps of: assigning a unique third party identifier to said licensee; assigning a range of carrier identifiers for said licensee; allowing said licensee to create a unique contractual agreement identifier by combining said unique third party identifier with an identifier chosen from said range of carrier identifiers; and associating, in a gateway program, said unique contractual agreement identifier with one or more software versions acceptable by a carrier for download onto said mobile station hardware.

The present application further provides a system for allowing a licensee having mobile station hardware to support its own set of carriers and addresses software demands of these carriers, the software including at least one of licensor software and mobile station manufacturer software, the system comprising: memory on said mobile station hardware, the memory storing a unique contractual agreement identifier comprised of a unique third party identifier for said licensee combined with an identifier chosen from a range of carrier identifiers; a computer connected to said mobile station hardware, said computer including a gateway program for associating each of a plurality of unique contractual agreement identifiers with one or more software versions acceptable by a carrier for download onto said mobile station hardware; and software on said computer to allow a software download onto said mobile station hardware if an association between said unique contractual agreement identifier and the software version of the software being downloaded exists as determined by said gateway program.

BRIEF DESCRIPTION OF THE DRAWINGS

The present system and method will be better understood with reference to the drawings in which.

DETAILED DESCRIPTION OF THE DRAWINGS

A mobile communications device, such as a phone, is typically formed of software, firmware, and hardware adapted to provide communications services over a wireless communications network. This process of forming the relationship between the mobile communications device and the service is known in the art as provisioning. Typically a network operator provisions the mobile via a subscription to a service contract. Thus, once the mobile has been provisioned, the user of the mobile is often referred to as a subscriber.

In a voice and data network such as GSM (Global System for Mobile Communication) and GPRS (General Packet Radio System), CDMA (Code Division Multiple Access), or various other third generation networks such as EDGE (Enhanced Data rates for GSM Evolution) or UMTS (Universal Mobile Telecommunications Systems), both voice and data services may be available to mobile communications devices. Example voice services include voice calling and Short Messaging Service (SMS). Example data services include Internet browsing, email, and Multimedia Messaging Service (MMS).

Although many services may be available on a given network, only those subscribers that use mobile communications devices that have been provisioned for those services will be able to benefit from them. This may present problems for the subscriber and the network operator alike. On one hand, the subscriber may desire an existing service he does not have, i.e. an upgrade, or desire disabling a service, i.e. a downgrade. On the other hand the operator may want to offer a new service, but may hesitate if subscribers cannot benefit from them.

Reference is now made to the drawings.

In order to maintain control of software loads on a mobile station, carriers will sometimes require that they approve the software upgrade prior to it being loaded onto the mobile station. This can occur, for example, if the carrier is subsidizing the mobile station and wants control over the connections allowable on the mobile station. It can also occur when the carrier wishes to ensure a certain performance level is maintained within its system.

A software provider such as an innovator software licensor, a software licensee, and the manufacturer of the mobile data station typically will ship a new software load to a carrier, who performs significant testing to ensure that the load meets certification procedures. Only then will a carrier allow the software to be actively used on its network. Carriers will (under contractual agreements) generally require mobile station software providers to ensure uncertified loads are not permitted onto their networks. This is especially true for data communications.

Figure 1:
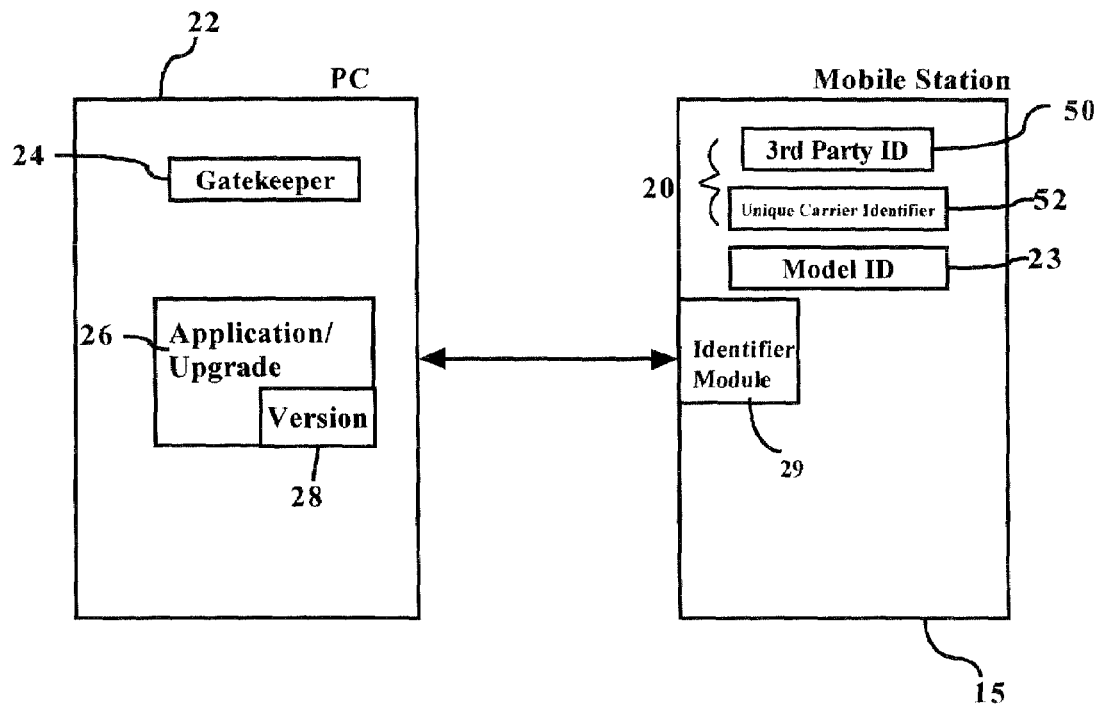
FIG. 1 is a block diagram showing elements required for the present system and method.

As illustrated in FIG. 1, a mobile station 15 preferably includes a unique vendor identifier 20 which references a contractual agreement by including allowed combinations of a third party identifier 50 and a unique carrier identifier 52, as is described in more detail below. Vendor identifier 20 can be any identifier and, in a preferred embodiment, is a 32-bit word. In accordance with the implementation described herein, an existing vendor identifier 20 is reused to implement the new contractual agreement enforced functionality. The invention is not intended to be limited to the reuse of the existing vendor identifier. In general, contractual agreement identifiers are obtained from licensee and carrier identifiers.

Preferably, vendor ID 20 is written into the read-only memory during the manufacture of the mobile station, and thereby cannot be erased or altered by a user.

Mobile station 15 further preferably includes a model identifier 23. Model identifier 23 is a unique identifier to indicate the model of mobile station 15, and can be any string of characters, numbers or combination thereof. Model identifier 23 is unique for each model of mobile station 15 made by the device manufacturer, and preferably is unique across various manufacturers.

Software upgrades, in a preferred embodiment, occur by connecting the mobile station to a personal computer 22. Various techniques for connecting a mobile station 15 to a personal computer 22 would be known to those skilled in the art and could include a USB connection, other serial port connection, an IrDA connection or a Bluetooth connection, among others.

An identifier module 29 on mobile station 15 controls the upgrading or addition of software to mobile station 15. Identifier module 15 passes the third party identifier 50, the unique carrier identifier 52 and the model identifier 23 to personal computer 22.

Personal computer 22 can obtain software uploads either through physical medium such as compact discs or digital video discs, or can download the software from a server over a network. Other means of obtaining upgrades would be known to those skilled in the art.

Along with an upgrade, a personal computer 22 will receive a gatekeeper program 24. The purpose of the gatekeeper program 24 is to ensure that only valid software upgrades can be loaded onto the mobile station 15.

A valid user upgrade is one that a carrier has approved for mobile station 15 based on the version number of the upgrade. Each upgrade 26 includes a version 28. The version 28 is unique to the upgrade.

Gatekeeper program 24 is maintained to include a current list of vendor IDs and the upgrade versions allowed to be loaded onto a mobile station with that vendor ID 20. For example, if a carrier with a vendor ID 0x00000001 approves a software version 1.5 for model ID 1000, then gatekeeper program 24 will be updated to indicate that vendor ID 0x00000001 allows software upgrade 1.5 for model ID 1000. Thereafter, a user who has model ID 1000 with Vendor ID 0.00000001 who tries to download software version 1.5 onto mobile station 15 will be allowed to do so. In the present embodiment, the vendor identifier 20 is replaced by the contractual relationship identifier 20.

The above uses a personal computer 22 to upload software. As will be appreciated by those skilled in the art, software could also be provisioned over the air, and the above is not meant to limit the provisioning of software from a personal computer. In the case of over the air provisioning, identifier module 29 uses a radio link to connect to a base station, and ultimately to a server having the software upgrade. The server will include the gatekeeper program 24 and will have the available upgrade 26 with the version identifier 28.

In the case of over the air provisioning, identifier module 29 passes the identifier 20 consisting of the third party identifier 50 and the unique carrier identifier 52, along with model identifier 23 to the server, which then determines through gatekeeper program whether the application upgrade 26 being requested can be downloaded to mobile station 15. The determination by gatekeeper program 24 is described below, and the operation of this program is the same regardless of the provisioning method.

The description of the figures below refers to personal computer 22 as an example only, and could equally refer to a server for over the air provisioning.

Figure 2:
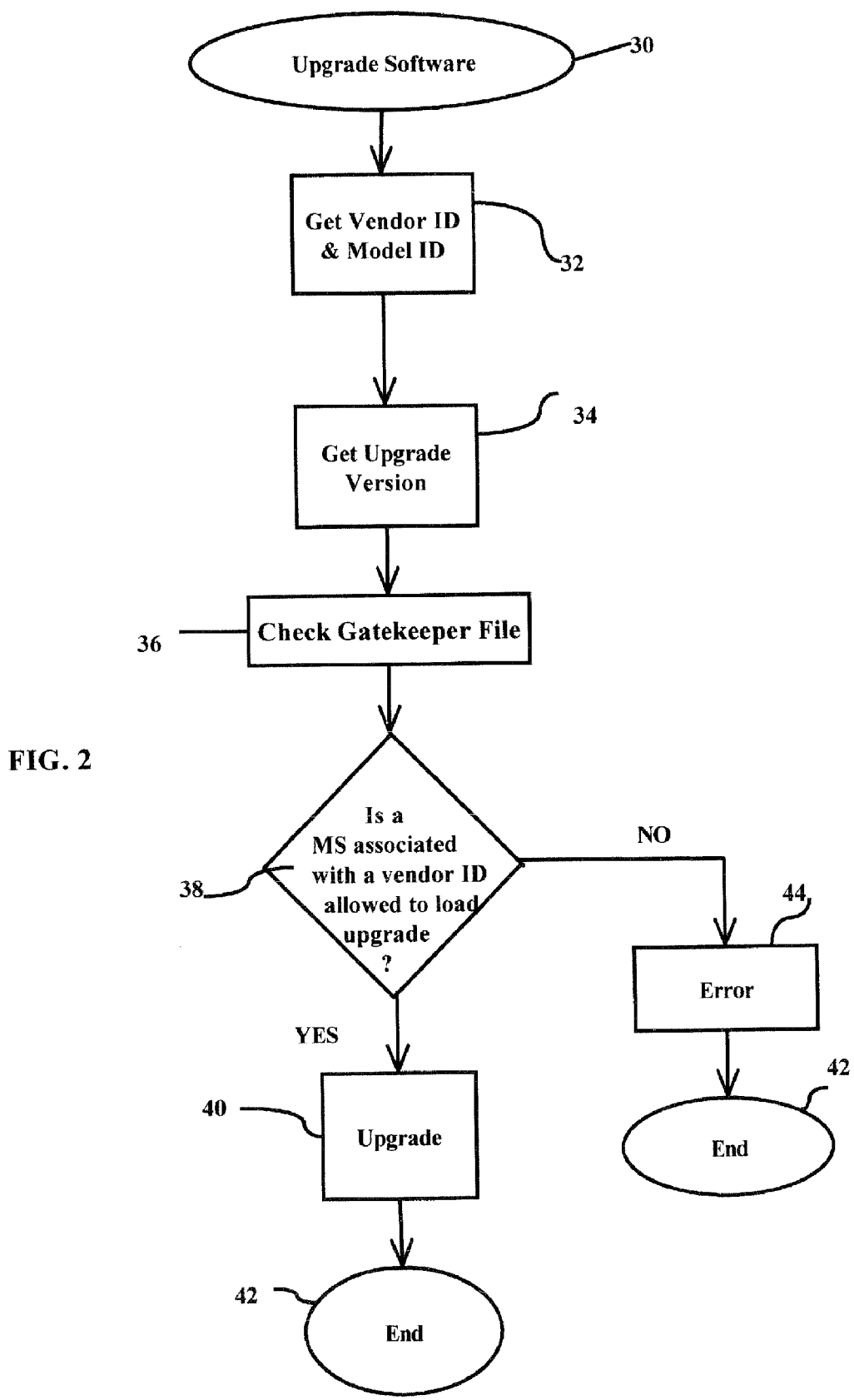
FIG. 2 is a flowchart of a method used for downloading software onto a mobile station.

Reference is now made to FIG. 2. A user wishes to upgrade software in step 30 and, when initiating the upgrade, personal computer 22 proceeds to step 32 and gets the ID 20 from mobile station 15. Personal computer 22 next proceeds to step 34 in which the version number of the upgrade is obtained. Personal computer 22, in step 36, passes the ID 20 and the upgrade version to the gatekeeper program 24. These two numbers are checked within the gatekeeper program to indicate whether the mobile station associated with the ID 20 is allowed to load the specific upgrade version in step 38.

If, in step 38, it is determined that the upgrade version is allowed to be loaded, personal computer 22 next proceeds to step 40 in which the upgrade is started and the software is passed to the mobile station. Once the upgrade is finished, the process ends in step 42.

Conversely, if, in step 38 it is determined that the upgrade is not allowed, personal computer 22 proceeds to step 44 in which an error is indicated and the process next moves to step 42 and ends the process.

While the above works effectively in the case where the manufacturer of the mobile station is the same party that is providing the software upgrades, the above works less effectively when a third-party mobile station maker is loading a licensor's data device upgrades. In that case, the relationship between a carrier and a third-party dictates which software upgrades can be loaded onto a device and it becomes onerous for the maker of the software upgrades to maintain gatekeeper programs for each third-party. Further, the third party licensee may have its own applications it or the carrier wishes to control the loading of, and if a gatekeeper program is maintained by the licensor, the task of specifying which applications can be loaded for which carrier becomes onerous for the licensor.

Figure 3:
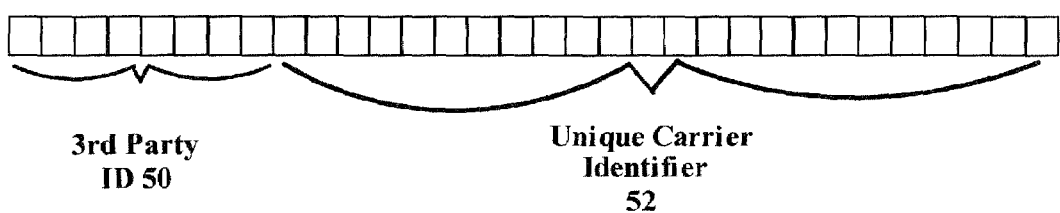
FIG. 3 is a block diagram of an example vendor ID according to the system and method herein.

Reference is now made to FIG. 3. In order to overcome the above, a ID 20 can be divided into third-party portion and a unique carrier identifier portion, 50 and 52 respectively.

By providing a sufficient number of bits for a third-party identifier 50, and also by providing sufficient unique carrier identifier 52 bits, control over gatekeeper program 24 can be transferred to the third-party.

In a preferred embodiment, third-party identifier 50 is preferably 8-bits and unique carrier identifier 52 is preferably 24 bits. Other configurations are however possible.

Preferably, the licensor of the data device software is assigned a unique identifier within identifier 50, thereby allowing equipment manufactured by the licensor to also be used and for the licensor to maintain its own relationships with carriers for its own equipment. In a preferred embodiment, the maker (innovator) of the data device software is assigned code of 0x00.

The first third-party would thereafter be assigned 0x01, the second third-party would be assigned 0x02, and so on to 0xFF. As will be appreciated by those skilled in the art, this allows for 254 licensees or third-party and one code used to identify the developer's or licensor's product.

After a third-party licensee is assigned a third-party identifier 50, that third-party licensee then has control over unique carrier identifier 52. In other words, a first licensee with the third-party identifier 0x01 will then have the range of 0x01000000 to 0x01FFFFFFFF. Thus, the third-party licensee is given the opportunity to negotiate with carriers regarding the upgrade loads allowed on the third-party device and assign each carrier a unique identifier in order to maintain control of a gatekeeper program for the software for this third-party licensee. Further, the licensee, through its unique third party identifier 50 and its carrier identifier 52 can create relationships with carriers and negotiate for the allowance of the licensee's own applications or other applications not made by the licensor and to be loaded onto the mobile station.

For clarity, the third party identifier 50 can be larger or smaller than 8 bits, as can be carrier identifier 50. Further the combination of identifiers 50 and 52 does not need to necessarily be 32 bits. These values are examples only. Reuse of the existing vendor identifier is not essential.

Control over a gatekeeper program with unique identifiers starting with the third party licensee's identifier 50 can then be passed to the licensee, ensuring that the licensor is not responsible for maintaining the gatekeeper program current for relationships between the licensee and carriers. It further ensures that carriers have a degree of control over data device software that they have come to expect in their relationships with the licensor.

Figure 4:
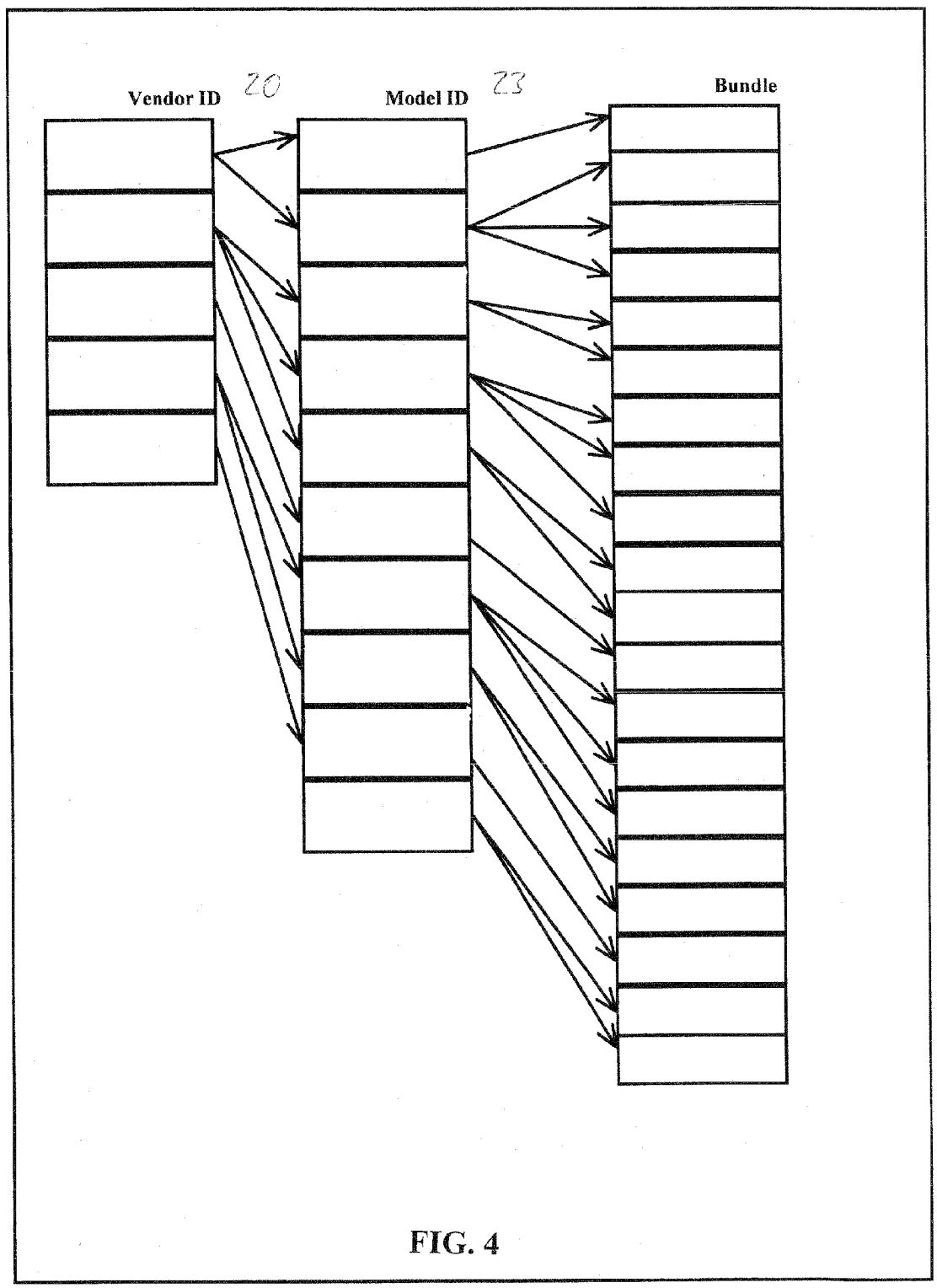
FIG. 4 is an exemplary diagram of a gatekeeper file and the relationships of the elements therein.

Reference is now made to FIG. 4. FIG. 4 shows an exemplary gatekeeper program 24 showing the relationship between identifier 20, model identifier 23, and a bundle which includes version 28. When a gatekeeper program is passed the ID 20 and model ID 23 in step 32 and the upgrade version in step 34, it compares these numbers to ensure that the version number 28 corresponds with the ID 20 and model ID 23 in order to allow the software to be downloaded onto the mobile station 15.

As seen in FIG. 4, each identifier 20 can be associated with one or more model identifiers 23. Specifically, a single identifier 20 can have multiple model identifiers 23 associated with it since a specific third party licensee/licensor and carrier could have various agreements based on different models of mobile stations.

Each identifier 20 and model identifier 23 pair in turn can have one or more bundles associated with it. A bundle is a software upgrade version, and includes version number 28 for the comparison. Thus, a identifier 20 and model identifier 23 pair, in a preferred embodiment, can have multiple software versions which are allowed to be downloaded to the mobile station 15. As will be appreciated, in some cases no software has yet been approved for a identifier 20 and a model identifier pair, in this case no bundles would be associated with the pair. Conversely, multiple bundles are also allowed if both the carrier and the third party licensee have approved them.

A further consequence of the above is that a mobile station associated with a third party may be allowed to load software with a specific version number, whereas the same mobile station associated with a different third party may not be. Thus the carrier can control its relationships and determine who is allowed to use what software on the carrier's network.

Figure 5:
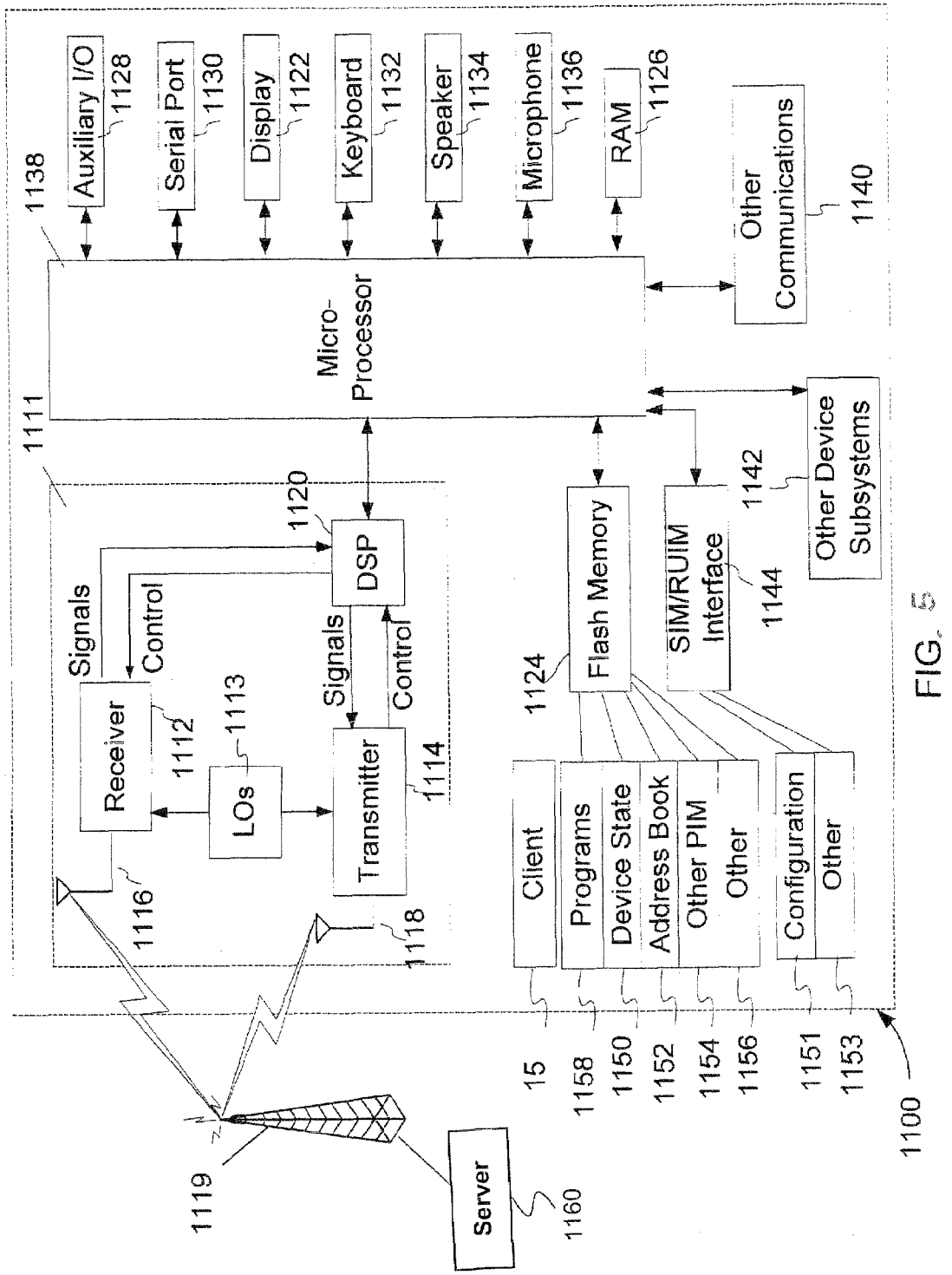
FIG. 5 is a block diagram of an exemplary third-party mobile station incorporating a data device client thereon.

Reference is now made to FIG. 5. FIG. 5 illustrates an exemplary mobile station on which licensor software can be loaded. One skilled in the art will appreciate that other devices could also be used.

FIG. 5 is a block diagram illustrating a host mobile station including preferred embodiments of the techniques of the present application. Mobile station 1100 is preferably a two-way wireless communication device having at least voice and data communication capabilities. Mobile station 1100 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile device 1100 is enabled for two-way communication, it will incorporate a communication subsystem 1111, including both a receiver 1112 and a transmitter 1114, as well as associated components such as one or more, preferably embedded or internal, antenna elements 1116 and 1118, local oscillators (LOs) 1113, and a processing module such as a digital signal processor (DSP) 1120. As will be apparent to those skilled in the field of communications, the particular design of the communication subsystem 1111 will be dependent upon the communication network in which the device is intended to operate. For example, mobile station 1100 may include a communication subsystem 1111 designed to operate within the Mobitex™ mobile communication system, the DataTAC™ mobile communication system, GPRS network, UMTS network, EDGE network or CDMA network.

Network access requirements will also vary depending upon the type of network 1119. For example, in the Mobitex and DataTAC networks, mobile station 1100 is registered on the network using a unique identification number associated with each mobile station. In UMTS and GPRS networks, and in some CDMA networks, however, network access is associated with a subscriber or user of mobile station 1100. A GPRS mobile station therefore requires a subscriber identity module (SIM) card in order to operate on a GPRS network, and a RUIM in order to operate on some CDMA networks. Without a valid SIM/RUIM card, a GPRS/UMTS/CDMA mobile station may not be fully functional. Local or non-network communication functions, as well as legally required functions (if any) such as "911" emergency calling, may be available, but mobile station 1100 will be unable to carry out any other functions involving communications over the network 1100. The SIM/RUIM interface 1144 is normally similar to a card-slot into which a SIM/RUIM card can be inserted and ejected like a diskette or PCMCIA card. The SIM/RUIM card can have approximately 64K of memory and hold many key configuration 1151, and other information 1153 such as identification, and subscriber related information.

When required network registration or activation procedures have been completed, mobile station 1100 may send and receive communication signals over the network 1119. Signals received by antenna 1116 through communication network 1119 are input to receiver 1112, which may perform such common receiver functions as signal amplification, frequency down conversion, filtering, channel selection and the like, and in the example system shown in FIG. 5, analog to digital (A/D) conversion. A/D conversion of a received signal allows more complex communication functions such as demodulation and decoding to be performed in the DSP 1120. In a similar manner, signals to be transmitted are processed, including modulation and encoding for example, by DSP 1120 and input to transmitter 1114 for digital to analog conversion, frequency up conversion, filtering, amplification and transmission over the communication network 1119 via antenna 1118. DSP 1120 not only processes communication signals, but also provides for receiver and transmitter control. For example, the gains applied to communication signals in receiver 1112 and transmitter 1114 may be adaptively controlled through automatic gain control algorithms implemented in DSP 1120.

Network 1119 may further communicate with multiple systems, including a server 1160 and other elements (not shown). For example, network 1119 may communicate with both an enterprise system and a web client system in order to accommodate various clients with various service levels.

Mobile station 1100 preferably includes a microprocessor 1138 which controls the overall operation of the device. Communication functions, including at least data and voice communications, are performed through communication subsystem 1111. Microprocessor 1138 also interacts with further device subsystems such as the display 1122, flash memory 1124, random access memory (RAM) 1126, auxiliary input/output (I/O) subsystems 1128, serial port 1130, keyboard 1132, speaker 1134, microphone 1136, a short-range communications subsystem 1140 and any other device subsystems generally designated as 1142.

Some of the subsystems shown in FIG. 5 perform communication-related functions, whereas other subsystems may provide "resident" or on-device functions. Notably, some subsystems, such as keyboard 1132 and display 1122, for example, may be used for both communication-related functions, such as entering a text message for transmission over a communication network, and device-resident functions such as a calculator or task list.

Operating system software used by the microprocessor 1138 is preferably stored in a persistent store such as flash memory 1124, which may instead be a read-only memory (ROM) or similar storage element (not shown). Those skilled in the art will appreciate that the operating system, specific device applications, or parts thereof, may be temporarily loaded into a volatile memory such as RAM 1126. Received communication signals may also be stored in RAM 1126. Further, a unique identifier is also preferably stored in read-only memory.

As shown, flash memory 1124 can be segregated into different areas for both computer programs 1158 and program data storage 1150, 1152, 1154 and 1156. These different storage types indicate that each program can allocate a portion of flash memory 1124 for their own data storage requirements. Microprocessor 1138, in addition to its operating system functions, preferably enables execution of software applications on the mobile station. A predetermined set of applications that control basic operations, including at least data and voice communication applications for example, will normally be installed on mobile station 1100 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 1119. In a preferred embodiment, the PIM data items are seamlessly integrated, synchronized and updated, via the wireless network 1119, with the mobile station user's corresponding data items stored or associated with a host computer system. Further applications may also be loaded onto the mobile station 1100 through the network 1119, an auxiliary I/O subsystem 1128, serial port 1130, short-range communications subsystem 1140 or any other suitable subsystem 1142, and installed by a user in the RAM 1126 or preferably a non-volatile store (not shown) for execution by the microprocessor 1138. Such flexibility in application installation increases the functionality of the device and may provide enhanced on-device functions, communication-related functions, or both. For example, secure communication applications may enable electronic commerce functions and other such financial transactions to be performed using the mobile station 1100. These applications will however, according to the above, in many cases need to be approved by a carrier.

In a data communication mode, a received signal such as a text message or web page download will be processed by the communication subsystem 1111 and input to the microprocessor 1138, which preferably further processes the received signal for output to the display 1122, or alternatively to an auxiliary I/O device 1128. A user of mobile station 1100 may also compose data items such as email messages for example, using the keyboard 1132, which is preferably a complete alphanumeric keyboard or telephone-type keypad, in conjunction with the display 1122 and possibly an auxiliary I/O device 1128. Such composed items may then be transmitted over a communication network through the communication subsystem 1111.

For voice communications, overall operation of mobile station 1100 is similar, except that received signals would preferably be output to a speaker 1134 and signals for transmission would be generated by a microphone 1136. Alternative voice or audio I/O subsystems, such as a voice message recording subsystem, may also be implemented on mobile station 1100. Although voice or audio signal output is preferably accomplished primarily through the speaker 1134, display 1122 may also be used to provide an indication of the identity of a calling party, the duration of a voice call, or other voice call related information for example.

Serial port 1130 in FIG. 5 would normally be implemented in a personal digital assistant (PDA)-type mobile station for which synchronization with a user's desktop computer (not shown) may be desirable. Such a port 1130 would enable a user to set preferences through an external device or software application and would extend the capabilities of mobile station 1100 by providing for information or software downloads to mobile station 1100 other than through a wireless communication network. The alternate download path may for example be used to load an encryption key onto the device through a direct and thus reliable and trusted connection to thereby enable secure device communication.

Other communications subsystems 1140, such as a short-range communications subsystem, is a further optional component which may provide for communication between mobile station 1100 and different systems or devices, which need not necessarily be similar devices. For example, the subsystem 1140 may include an infrared device and associated circuits and components or a Bluetooth™ communication module to provide for communication with similarly enabled systems and devices.

The above therefore illustrates a method and a system for a third party mobile station to maintain control over a gatekeeper program to ensure applications and software updates for a mobile station can be pre-approved by a carrier. The system and method allow for the upgrades while eliminating the need for a licensor of software from maintaining the gatekeeper program. Overlaps between various licensees and carriers are eliminated through the assignment of unique third party identifiers and a range of carriers allowed for that third party identifier. This prevents accidental loading of unapproved software onto the mobile station, which could be potentially malicious or harmful to the mobile station or network.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method for provisioning a mobile device comprising:
receiving a contractual agreement identifier and a model identifier, the contractual agreement identifier including a licensee identifier field configured to uniquely identify a licensee from a plurality of licenses, and a carrier identifier field storing one of a plurality of carrier identifiers;
comparing the contractual agreement identifier and model identifier against a software version identifier in a file; and
responsive to the comparing, provisioning the mobile device with software having the software version identifier.

2. The method of claim 1, wherein the provisioning is done over the air.

3. The method of claim 2, wherein a gatekeeper program on a network server performs the method.

4. The method of claim 3, wherein the gatekeeper program is unique for each licensee.

5. The method of claim 4, wherein the gatekeeper program is provided for a single licensee identifier.

6. The method of claim 1, wherein the provisioning is done from a personal computer.

7. The method of claim 6, wherein the provisioning is done over a serial interface.

8. The method of claim 7, wherein the serial interface is selected from the group consisting of: a universal serial bus interface, an IrDA interface, and a Bluetooth™ interface.

9. The method of claim 1, wherein the licensee identifier identifies a manufacturer of a mobile device.

* * * * *